Patented Oct. 6, 1936

2,056,837

UNITED STATES PATENT OFFICE 2,056,837

REFINING OLEFINE SULPHIDE

Werner W. Duecker and Claron R. Payne, Pittsburgh, Pa., assignors to Texas Gulf Sulphur Company, a corporation of Texas No Drawing. Application September 27, 1934, Serial No. 745,756

4 Claims. (Cl. 260—6)

This invention consists in the refining of olefine sulphide.

In an application for Letters Patent of the United States, Serial No. 662,113, filed March 22, 1933, by Werner W. Duecker, one of the present applicants, a procedure is described of causing olefine gas to bubble through a bath of molten sulphur, with the consequence and effect that olefine sulphide is formed. Olefine sulphides may also be produced by the reaction of a polysulphide (calcium polysulphide, for example) upon olefine halogen additive compounds, or upon another reagent—an aldehyde, for example. The invention is applicable to olefine sulphide, however produced. We have discovered that olefine sulphide, whether produced in one or another way, may be separated into a plurality of distinct fractions, having severally distinct characteristics, and that thus for particular purposes the olefine sulphide may be refined.

We have discovered that olefine sulphide, whether produced by one procedure or the other, is of complex nature, and that by bringing the reaction product of either of the procedures described above into contact with one or another particular solvent (including, of course, mixtures of such solvents) one fraction of such reaction product will go into solution, leaving insoluble another fraction, which other insoluble fraction may be separated from the first. Then, by evaporation of the solvent, the two fractions may be severally recovered. The two fractions have certain characteristics in common: both are soluble in sulphur; both may be modified by vulcanization and by treatment with various reagents—by phosphorous sulphide, for example; both are more readily subject to modification in physical characteristics than is the complex from which they are derived. The fractions have other and distinguishing characteristics: the insoluble fraction (if the material under treatment was produced by the second procedure characterized above) is relatively hard and horny (if produced by the first procedure it resembles an oil); while the soluble fraction is in either case flexible and plastic, and, unlike both the original reaction product and the insoluble fraction, it is practically odorless.

Instead of effecting fractionation first and then modifying one or both of the fractions, it is possible first to effect modification of the reaction product, as by vulcanization or by treatment with such a reagent as phosphorus sulphide, and then in the manner described to separate the modified material into fractions.

Solvents suitable for effecting fractionation are liquid sulphides, of which carbon bisulphide is an example; the aromatic solvents, of which aniline, benzene, and toluene are representative; the chlorinated aromatics, of which chlorinated diphenyl and chlorinated naphthalene are representative; and the chlorinated derivatives of the aliphatics, of which chloroform and ethylene dichloride are examples.

The fraction that by virtue of solubility has been separated may, after recovery, by the addition of plasticizers and other suitable and known ingredients, be used as a lacquer or paint; it may, by the addition of a plasticizer, be rendered susceptible to being spread upon the surface of another body, and then, on evaporation of the plasticizer, it will remain as a tough, rubber-like, but not tacky, protective coating. It may, when properly plasticized, be caused to coat the surfaces of and to integrate the particles of such a filler material as saw-dust, for example, or other filler material, and the so-treated filler material may then be molded to desired shape. Porous articles may be impregnated with solutions of this soluble fraction, and the solvent evaporated.

The insoluble fraction also, as has been said, may by treatment with such reagents as phosphorus sulphide and by vulcanization be prepared for particular practical uses.

We claim as our invention:

1. The method herein described of refining olefine sulphide which consists in effecting a fractional solution and separating the undissolved from the dissolved material.

2. The method herein described of refining the reaction product of an olefine and sulphur which consists in effecting a fractional solution and separating the undissolved from the dissolved material.

3. The method herein described of refining the reaction product of a polysulphide and an olefine halogen compound which consists in effecting a fractional solution and separating the undissolved from the dissolved material.

4. The step herein described in the method of refining the reaction product of an olefine and sulphur which consists in effecting a fractional solution in a chlorinated derivative of an aliphatic hydrocarbon and separating the undissolved from the dissolved material.

WERNER W. DUECKER.
CLARON R. PAYNE.